(12) United States Patent
Mark et al.

(10) Patent No.: US 11,574,548 B2
(45) Date of Patent: Feb. 7, 2023

(54) AIRCRAFT DEGRADED OPERATION CEILING INCREASE USING ELECTRIC POWER BOOST

(71) Applicant: PRATT & WHITNEY CANADA CORP., Longueuil (CA)

(72) Inventors: Michael Mark, Montreal (CA); Richard Ullyott, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 114 days.

(21) Appl. No.: 16/709,514

(22) Filed: Dec. 10, 2019

(65) Prior Publication Data
US 2020/0342772 A1 Oct. 29, 2020

Related U.S. Application Data

(60) Provisional application No. 62/838,837, filed on Apr. 25, 2019.

(51) Int. Cl.
*G08G 5/00* (2006.01)
*B64D 27/24* (2006.01)
(Continued)

(52) U.S. Cl.
CPC .......... *G08G 5/0039* (2013.01); *B64D 27/24* (2013.01); *G08G 5/0021* (2013.01);
(Continued)

(58) Field of Classification Search
CPC ............ B64C 39/024; B64C 2201/042; B64C 2201/027; B64C 2201/128;
(Continued)

(56) References Cited

U.S. PATENT DOCUMENTS 6,703,747 B2 3/2004 Kawamura
6,864,667 B2 3/2005 Buening et al.
(Continued)

FOREIGN PATENT DOCUMENTS

BR PI0622106 A2 12/2011
BR 102014025950 A2 5/2016
(Continued)

OTHER PUBLICATIONS

International Search Report and Written Opinion issued in corresponding PCT Application No. PCT/US2019/065490, dated Apr. 9, 2020.
(Continued)

*Primary Examiner* — Maceeh Anwari
*Assistant Examiner* — Aarron E Santos
(74) *Attorney, Agent, or Firm* — Locke Lord LLP; Daniel J. Fiorello; Gabrielle Gelozin

(57) ABSTRACT

An aircraft navigational system for a multiengine aircraft can include a flight planning module configured to receive two or more navigational points defining a route and determine if a first degraded operation ceiling is high enough to travel along the route based on obstacle data defining relative location of one or more obstacles and one or more obstacle clearance standards. The module can be configured to receive a status and/or performance limitation of an electric motor system of the aircraft. The module can be configured to determine if the electric motor system is or will be able to provide temporary additional power to produce a second degraded operation ceiling for at least a required time based on the status and/or performance limitation of the electric motor system if the first degraded operation ceiling is not high enough to permit travel along the route. The second degraded operation ceiling can be high
(Continued)

enough to travel along the route based on the obstacle data and the one or more obstacle clearance standards.

20 Claims, 2 Drawing Sheets

(51) Int. Cl.
  *G08G 5/04* (2006.01)
  *B64D 27/02* (2006.01)
(52) U.S. Cl.
  CPC ........... *G08G 5/0056* (2013.01); *G08G 5/045* (2013.01); *B64D 2027/026* (2013.01)
(58) Field of Classification Search
  CPC ......... B64C 2201/126; B64C 2201/14; B64C 2201/145; B64C 2201/146; B64C 2201/123; B64C 2201/122; B64C 2201/066; B64C 13/00; B64C 15/02; B64C 2201/108; B64C 2201/141
  See application file for complete search history.

(56) References Cited

U.S. PATENT DOCUMENTS

| | | | |
|---|---|---|---|
| 7,122,933 B2 | 10/2006 | Horst et al. | |
| 7,915,778 B2 | 3/2011 | Miyata et al. | |
| 8,350,437 B2 | 1/2013 | Doushita et al. | |
| 8,358,046 B2 | 1/2013 | Platon | |
| 8,368,276 B2 | 2/2013 | Wolf et al. | |
| 8,532,961 B2 | 9/2013 | Guo | |
| 8,844,143 B2 | 9/2014 | Kirchner et al. | |
| 9,174,741 B2 | 11/2015 | Suntharalingam et al. | |
| 10,145,291 B1 | 12/2018 | Thomassin et al. | |
| 10,170,954 B2 | 1/2019 | Taniguchi et al. | |
| 10,326,326 B2 | 6/2019 | Laldin et al. | |
| 10,494,117 B2 | 12/2019 | Bosma | |
| 2005/0237766 A1 | 10/2005 | Klettke | |
| 2008/0017426 A1 | 1/2008 | Walters et al. | |
| 2008/0078876 A1 | 4/2008 | Baggette et al. | |
| 2008/0141921 A1 | 6/2008 | Hinderks | |
| 2010/0251692 A1 | 10/2010 | Kinde, Sr. | |
| 2010/0270417 A1 | 10/2010 | Goldshteyn | |
| 2011/0024555 A1 | 2/2011 | Kuhn, Jr. | |
| 2011/0049293 A1 | 3/2011 | Koletzko | |
| 2012/0012692 A1 | 1/2012 | Kroo | |
| 2012/0059631 A1* | 3/2012 | Heinzerling | G01C 21/20 703/2 |
| 2012/0111994 A1 | 5/2012 | Kummer et al. | |
| 2012/0227389 A1 | 9/2012 | Hinderks | |
| 2013/0020429 A1 | 1/2013 | Kroo | |
| 2013/0068876 A1 | 3/2013 | Radu | |
| 2013/0157017 A1 | 6/2013 | Guillemaut et al. | |
| 2013/0327014 A1 | 12/2013 | Moulebhar | |
| 2014/0117148 A1* | 5/2014 | Dyrla | B64D 35/08 244/17.13 |
| 2014/0180507 A1 | 6/2014 | Geay et al. | |
| 2015/0183518 A1 | 7/2015 | Stuckl et al. | |
| 2015/0210407 A1 | 7/2015 | Griffin et al. | |
| 2015/0321752 A1 | 11/2015 | Trull et al. | |
| 2016/0023747 A1 | 1/2016 | Kempshall | |
| 2016/0144957 A1 | 5/2016 | Claridge et al. | |
| 2016/0221680 A1 | 8/2016 | Burton et al. | |
| 2016/0236790 A1* | 8/2016 | Knapp | B64C 11/44 |
| 2016/0272310 A1 | 9/2016 | Chan et al. | |
| 2016/0304199 A1 | 10/2016 | Chan et al. | |
| 2016/0347446 A1 | 12/2016 | Vetter et al. | |
| 2017/0131687 A1* | 5/2017 | Mercier-Calvairac | G05B 13/024 |
| 2017/0320585 A1 | 11/2017 | Armstrong et al. | |
| 2017/0341725 A1 | 11/2017 | Skahan | |
| 2017/0344181 A1* | 11/2017 | Kneuper | G08G 5/0091 |
| 2018/0127103 A1 | 5/2018 | Cantemir | |
| 2018/0141655 A1 | 5/2018 | Wall | |
| 2018/0208305 A1 | 7/2018 | Lloyd et al. | |
| 2018/0215462 A1 | 8/2018 | Fenny et al. | |

FOREIGN PATENT DOCUMENTS

| | | |
|---|---|---|
| EP | 3594125 A1 | 1/2020 |
| JP | 2012056566 A | 3/2012 |
| JP | 2014159255 A | 9/2014 |
| JP | 2015006650 A | 1/2015 |
| JP | WO2017126584 A1 | 12/2018 |
| KR | 200408970 Y1 | 2/2006 |
| KR | 20070039699 A | 4/2007 |
| KR | 101277645 B1 | 6/2013 |
| KR | 20150018018 A | 2/2015 |
| KR | 101513661 B | 4/2015 |
| KR | 101659783 B1 | 9/2016 |
| KR | 101752859 B1 | 6/2017 |
| WO | 2009053649 A | 4/2009 |
| WO | 2010020199 A1 | 2/2010 |
| WO | 2011005066 A2 | 1/2011 |
| WO | 2018058137 A1 | 3/2018 |
| WO | 2018099856 A1 | 6/2018 |
| WO | 2018104929 A1 | 6/2018 |
| WO | WO-2019023322 A1 | 1/2019 |

OTHER PUBLICATIONS

Extended European Search Report for European Patent Application No. EP19926082.9, dated Oct. 17, 2022.

* cited by examiner

AIRCRAFT DEGRADED OPERATION CEILING INCREASE USING ELECTRIC POWER BOOST

CROSS-REFERENCE TO RELATED APPLICATION

This application claims priority to and the benefit of U.S. Provisional Patent Application Ser. No. 62/838,837, filed Apr. 25, 2019, the contents thereof being incorporated herein by reference in their entirety.

BACKGROUND

1. Field

This disclosure relates to multiengine aircraft, e.g., twin engine aircraft (e.g., an aircraft having one or more hybrid electric powerplants).

2. Description of Related Art

Multi engine aircraft are designed to operate with one or more engines failed. Dual engine aircraft, for example, may be designed to operate with one engine completely failed, referred to as One Engine Inoperative (OEI) operation.

Aircraft performance characteristics dictate the maximum altitude at which the aircraft can safely fly during OEI and maintain safe margins. This is referred to as the OEI ceiling. The OEI is used for flight route planning, for example. The aircraft must have sufficient margin to fly over potential obstacles during OEI. The OEI ceiling is the limitation of the engine output power. At full power, the engine cannot provide sufficient output power to propel the aircraft fast enough to maintain lift at higher altitudes, so it must descend to denser air where it is easier for the aircraft wings to produce lift, for example. Thus, given the loss of an engine, the maximum ceiling is reduced. For certain flight operations, a route has to be selected to have no obstacles above the maximum ceiling.

Such conventional methods and systems have generally been considered satisfactory for their intended purpose. However, there is still a need in the art for improved route planning systems and methods, for example. The present disclosure provides a solution for this need.

SUMMARY

An aircraft navigational system for a multiengine aircraft can include a flight planning module configured to receive two or more navigational points defining a route and determine if a first degraded operation ceiling is high enough to travel along the route based on obstacle data defining relative location of one or more obstacles and one or more obstacle clearance standards. The module can be configured to receive a status and/or performance limitation of an electric motor system of the aircraft. The module can be configured to determine if the electric motor system is or will be able to provide temporary additional power to produce a second degraded operation ceiling for at least a required time based on the status and/or performance limitation of the electric motor system if the first degraded operation ceiling is not high enough to permit travel along the route. The second degraded operation ceiling can be high enough to travel along the route based on the obstacle data and the one or more obstacle clearance standards.

The flight planning module can be configured to allow the route if the electric motor system is able to produce the second degraded operation ceiling for at least the required time. The module can be configured to not allow the route if the electric motor system is unable to produce the second degraded operation ceiling for at least the required time.

The flight planning module can be configured to determine an alternate route in compliance with the one or more obstacle clearance standards if the electric motor system is unable to produce the second degraded operation ceiling for at least the required time. The flight planning module can be configured to display the alternate route on a cockpit display for pilot notification and/or approval. In certain embodiments, the flight planning module can be configured to display a warning that the one or more obstacle clearance standards are not complied with for the route if the electric motor system is unable to produce the second degraded operation ceiling for at least the required time.

In certain embodiments, the multiengine aircraft can be a twin engine aircraft having a heat engine powerplant and a hybrid electric powerplant (HEP) having a heat engine system and the electric motor system. Any other suitable number of powerplants and/or configuration is contemplated herein.

The first degraded operation ceiling can be a first one engine inoperative (OEI) ceiling determined based only on power available from the heat engine system of the HEP. The second degraded operation ceiling can be a second OEI ceiling determined based on power available from both the heat engine system and the electric motor system of the HEP.

The status and/or performance limitation includes at least one of an electric motor operating limitation (e.g., temperature over time) and/or a battery state-of-charge (SOC). Any other suitable status and/or operating limitation(s) are contemplated herein. The module can utilize any other additional information (e.g., weather data, windage, a heat engine performance limitation, etc.) in determining if the electric motor system is able to produce the second degraded operation ceiling, for example.

In accordance with at least one aspect of this disclosure, a non-transitory computer readable medium, comprising computer executable instructions configured to cause a computer to perform a method, the method including any suitable method performed by any suitable embodiment of a module disclosed herein, e.g., as described above. Any other suitable method(s) and/or portions thereof are contemplated herein, e.g., as described below.

In accordance with at least one aspect of this disclosure, a method can include determining whether an aircraft has degraded performance obstacle clearance for a route based on a current status of an electric motor system and/or a predicted status of the electric motor system at or near a location of an obstacle. The status can be a battery state-of-charge (SOC) of the electric motor system, for example.

In certain embodiments, determining whether the aircraft has degraded performance obstacle clearance can be done by determining if the aircraft can maintain clearance of all obstacles along the route to a predefined obstacle clearance standard. The method can include determining an alternate route that provides degraded performance obstacle clearance to the predefined obstacle clearance standard.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
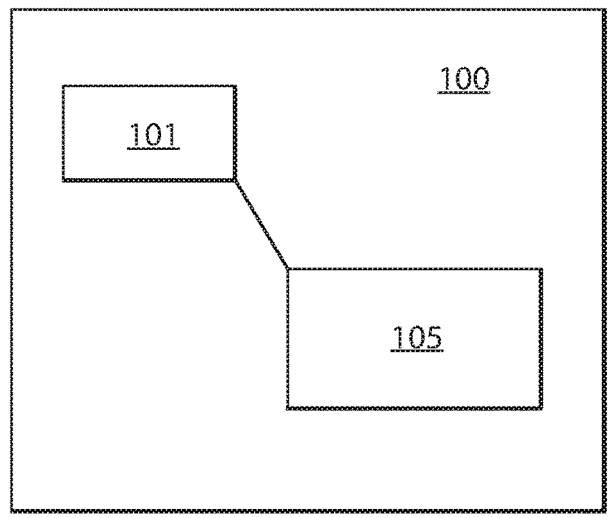
FIG. 1 is a schematic diagram of an embodiment of a system in accordance with this disclosure.
Figure 2A:
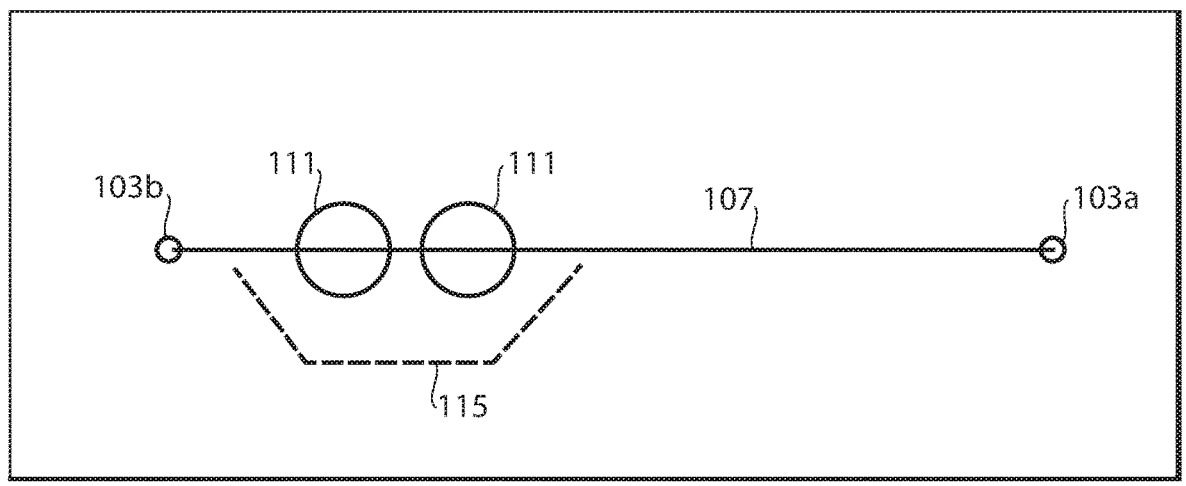
FIG. 2A is a plan view of a route over one or more obstacles between two navigational points.
Figure 2B:
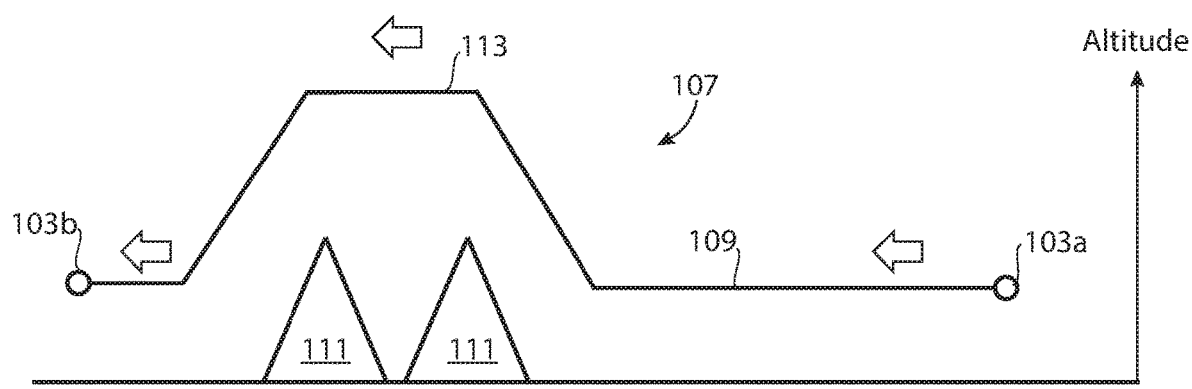
FIG. 2B is an elevation view of a route over one or more obstacles, showing multiple degraded operation ceilings relative to the one or more obstacles.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A and 2B. Certain embodiments described herein can be used to guarantee required degraded performance obstacle clearance for aircraft having one or more electric motor systems (e.g., a multiengine aircraft having at least one hybrid electric powerplant).

Referring to FIGS. 1, 2A, and 2B, an aircraft navigational system 100 for a multiengine aircraft can include a flight planning module 101 configured to receive two or more navigational points 103a, 103b (e.g., GPS coordinates) defining a route 107 (e.g., a line displayed on a map shown on a display 105). The route 107 can be a portion of a larger route (e.g., between two airports) or can be an entire route input to the system 100. The navigational system 100 can include any suitable user interface for receiving navigational point inputs (e.g., one or more dials, a touch screen interface integrated with display 105, and/or any other suitable system). The navigational system 100 and the module 101 can include any suitable hardware module and/or software module configured to perform any suitable function, e.g., as disclosed herein.

The module 101 can be configured to determine if a first degraded operation ceiling 109 (e.g., where one or more engines have failed) is high enough to travel along the route 107 based on obstacle data defining relative location of one or more obstacles 111 and one or more obstacle clearance standards (e.g., commercial instrument flight rules obstacle clearance standards). The obstacle data and/or one or more obstacle clearance standards can be locally stored on the system 100 (e.g., in any suitable computer readable medium on the system 100, e.g., associated with flight plan module 101). For example, the obstacle clearance standards may require 1000 foot clearance over any obstacles, or any other suitable clearance. As shown in FIG. 2B, the first degraded operation ceiling 109 can be below the minimum clearance requirements.

The module 101 can be configured to receive a status and/or performance limitation of an electric motor system of the aircraft. The module 101 can be configured to determine if the electric motor system is or will be able to provide temporary additional power to produce a second degraded operation ceiling 113 for at least a required time based on the status and/or performance limitation of the electric motor system if the first degraded operation ceiling 109 is not high enough to permit travel along the route 107, e.g., as shown in FIG. 2B. As appreciated by those having ordinary skill in the art in view of this disclosure, a sufficient time to fly over the one or more obstacles 111 can be a function of ground speed. The second degraded operation ceiling 113 can be high enough to travel along the route 107 based on the obstacle data and the one or more obstacle clearance standards.

The status and/or performance limitation can include at least one of an electric motor operating limitation (e.g., temperature over time) and/or a battery state-of-charge (SOC) (e.g., current and/or predicted at time of obstacle encounter). For example, the module 101 may receive a prediction of state-of-charge at the point where the aircraft must climb to maintain obstacle clearance standards and determine whether the battery has enough stored energy to climb sufficiently high for sufficiently long to fly over the one or more obstacles 111. Any other suitable status and/or operating limitation(s) (e.g., maximum power) are contemplated herein. The module 101 can utilize any other additional information (e.g., weather data, windage, a heat engine performance limitation, etc.) in determining if the electric motor system is able to produce the second degraded operation ceiling 113, for example.

The flight planning module 101 can be configured to allow the route 107 if the electric motor system is able to produce the second degraded operation ceiling 113 for at least the required time. The module 101 can be configured to not allow the route if the electric motor system is unable to produce the second degraded operation ceiling 113 for at least the required time.

The flight planning module 101 can be configured to determine an alternate route 115 in compliance with the one or more obstacle clearance standards if the electric motor system is unable to produce the second degraded operation ceiling 113 for at least the required time. The flight planning module 101 can be configured to display the alternate route 115 on a cockpit display for pilot notification and/or approval (e.g., as shown in FIG. 2B). In certain embodiments, in addition or separately, the flight planning module 101 can be configured to display a warning that the one or more obstacle clearance standards are not complied with for the route 107 if the electric motor system is unable to produce the second degraded operation ceiling 113 for at least the required time.

In certain embodiments, the multiengine aircraft can be a twin engine aircraft having a heat engine powerplant and a hybrid electric powerplant (HEP). The HEP can have a heat engine system and the electric motor system, for example. Any other suitable number of powerplants and/or configuration is contemplated herein (e.g., all HEPs, a plurality of HEPs, etc.).

The first degraded operation ceiling 109 can be a first one engine inoperative (OEI) ceiling determined based only on power available from the heat engine system of the HEP (e.g., maximum power), for example. The second degraded operation ceiling 113 can be a second OEI ceiling determined based on power available from both the heat engine system and the electric motor system of the HEP (e.g., maximum power from both). The second degraded operation ceiling 113 can be selected by the flight planning module 101 to be the minimum required altitude to fly over the one or more obstacles 111 to maximize the time available at the second degraded operation ceiling 113.

In accordance with at least one aspect of this disclosure, a non-transitory computer readable medium, comprising computer executable instructions configured to cause a computer to perform a method, the method including any suitable method performed by any suitable embodiment of a module disclosed herein, e.g., as described above. Any other suitable method(s) and/or portions thereof are contemplated herein, e.g., as described below.

In accordance with at least one aspect of this disclosure, a method can include determining whether an aircraft has degraded performance obstacle clearance for a route based on a current status of an electric motor system and/or a predicted status of the electric motor system at or near a location of an obstacle. The status can be a battery state-of-charge (SOC) of the electric motor system, for example.

In certain embodiments, determining whether the aircraft has degraded performance obstacle clearance can be done by determining if the aircraft can maintain clearance of all obstacles along the route to a predefined obstacle clearance standard. The method can include determining an alternate route that provides degraded performance obstacle clearance to the predefined obstacle clearance standard.

In accordance with certain embodiments, a hybrid-electric propulsion system can offer the functionality of a power boost that can increase the OEI ceiling of the aircraft. During an OEI event, the pilot can engage the electrical motor in addition to the heat motor to augment the overall engine output power, and have assurance that the selected route is navigable within certain standards, for example. The additional thrust can allow the aircraft to fly at higher altitudes, e.g., provided that sufficient battery power is available.

A hybrid electric control system can include a display for the state of charge not found in current cockpit layouts. It can be considered analogous to fuel weight remaining on the aircraft. The pilot may have indication of the air speed of the aircraft. Given that the stall speed is part of the aircraft flight limits and there may be aircraft protections to warn the pilot of potential aircraft stall (e.g., stick shaker, audible stall warning, etc.), the pilot can have sufficient information to engage the electric motor to increase speed and climb above an obstacle, if presented.

Performance charts outlining electric motor torque levels and battery consumption can be to be provided to allow the pilot to calculate the duration at altitude possible. Embodiments disclosed herein may be able to do such calculations using performance data, weather, etc., in determining if the route is acceptable.

In embodiments, as long as there is extra energy in the battery, OEI ceiling can be increased for a certain period of time. A higher ceiling will likely equal less time at that altitude. Embodiments can include flight planning module that can automatically calculate lowest OEI, highest electric modified OEI, and time at any modified OEI above lowest OEI. Embodiments can accept inputs including, e.g., route, engine operating limitations (e.g., temp over time), electric motor operating limitations (e.g., temp over time), battery state-of-charge (e.g. energy burn rate per unit altitude above min OEI to determine possible time at modified OEI), weather (e.g., temp, windage, diversion, turbulence), aircraft data (e.g., operating weight), or any other suitable inputs. Embodiments can display whether a route is unacceptable or acceptable, and/or possibly calculating and/or proposing alternate routes as a function of min/max OEI ceiling and/or any OEI ceiling in between.

Using embodiments herein, operators of aircraft with hybrid-electric propulsion would be less limited when planning routes. Routes may be required to account for single engine failures during the flight. Routes can be limited if there are mountains or obstacles such as weather between their starting and landing locations that are above the OEI ceiling. Given that only a proportion of the total power would be provided by the heat motor in a HEP system, the OEI ceiling may be lower than a traditional turbomachinery propelled aircraft. With the augmentation of the electrical motor provided power adding to the heat motor power, the aircraft may be able to fly more direct routes to a destination than an unboosted hybrid-electric propulsion system, which would save time and cost. Additional range can be realized by more direct routing.

Certain embodiments can project possible alternate altitude, speed, and distance profile capabilities with one or more hybrid propulsion systems based on a continuously monitored battery charge and electric drivetrain health, for example. Certain embodiments may be utilized in traditional twin engine operation, for example. Electric power may be temporarily used to boost altitude or speed to respond to, for example, air traffic control issues or obstacles. Certain embodiments can provide a system for forecasting and displaying in real time what capabilities the aircraft has (e.g., how high can the aircraft fly and/or for how long). In certain embodiments, the system can display instructions to the pilot to fly slower for some portion of the mission and use excess heat engine capability to charge the battery in order to temporarily achieve greater altitude or speed capability than given by heat engine capability alone at some other point (e.g., to climb over an obstacle). In certain embodiments, the system can display instructions to a pilot to enter a hold pattern to charge the battery with excess heat engine capability and notify the pilot when the charging time is or will be complete such that the aircraft can continue on route with sufficient OEI ceiling, for example.

As will be appreciated by those skilled in the art, aspects of the present disclosure may be embodied as a system, method, or computer program product, for example. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An aircraft navigational system for a multiengine aircraft, comprising:
    a flight planning module configured to:
        receive two or more navigational points defining a route;
        determine if a first degraded operation ceiling is high enough to travel along the route based on obstacle data defining relative location of one or more obstacles and one or more obstacle clearance standards;
        receive a status and/or performance limitation of an electric motor system of the aircraft; and
        if the first degraded operation ceiling is not high enough to permit travel along the route, determine if the electric motor system is or will be able to provide temporary additional power to produce a second degraded operation ceiling for at least a required time based on the status and/or performance limitation of the electric motor system, wherein the second degraded operation ceiling is high enough to travel along the route based on the obstacle data and the one or more obstacle clearance standards,
        wherein the first degraded operation ceiling is a first one engine inoperative (OEI) ceiling determined based only on power available from a first power source, wherein the second degraded operation ceiling is a second OEI ceiling higher than the first OEI ceiling determined based on power available from the first power source plus power available from a second power source.

2. The system of claim 1, wherein the flight planning module is configured to allow the route if the electric motor system is able to produce the second degraded operation ceiling for at least the required time and to not allow the route if the electric motor system is unable to produce the second degraded operation ceiling for at least the required time.

3. The system of claim 2, wherein the flight planning module is configured to determine an alternate route in compliance with the one or more obstacle clearance standards if the electric motor system is unable to produce the second degraded operation ceiling for at least the required time.

4. The system of claim 3, wherein the flight planning module is configured to display the alternate route on a cockpit display for pilot notification and/or approval.

5. The system of claim 1, wherein the flight planning module is configured to display a warning that the one or more obstacle clearance standards are not complied with for the route if the electric motor system is unable to produce the second degraded operation ceiling for at least the required time.

6. The system of claim 1, wherein the multiengine aircraft is a twin engine aircraft having a heat engine powerplant and a hybrid electric powerplant (HEP) having a heat engine system and the electric motor system.

7. The system of claim 6, wherein the first power source includes the heat engine system of the HEP, wherein the second power source includes the electric motor system of the HEP.

8. The system of claim 6, wherein the status and/or performance limitation includes at least one of an electric motor operating limitation and/or a battery state-of-charge (SOC).

9. A non-transitory computer readable medium, comprising computer executable instructions configured to cause a computer to perform a method, the method comprising:
receiving two or more navigational points defining a route;
determining if a first degraded operation ceiling is high enough to travel along the route based on obstacle data defining relative location of one or more obstacles and one or more obstacle clearance standards;
receiving a status and/or performance limitation of an electric motor system of the aircraft; and
if the first degraded operation ceiling is not high enough to permit travel along the route, determining if the electric motor system is or will be able to provide temporary additional power to produce a second degraded operation ceiling for at least a required time based on the status and/or performance limitation of the electric motor system, wherein the second degraded operation ceiling is high enough to travel along the route based on the obstacle data and the one or more obstacle clearance standards,
wherein the first degraded operation ceiling is a first one engine inoperative (OEI) ceiling determined based only on power available from a first power source, wherein the second degraded operation ceiling is a second OEI ceiling determined based on power available from the first power source plus an additional power source.

10. The non-transitory computer readable medium of claim 9, wherein the method includes allowing the route if the electric motor system is able to produce the second degraded operation ceiling for at least the required time, and not allowing the route if the electric motor system is unable to produce the second degraded operation ceiling for at least the required time.

11. The non-transitory computer readable medium of claim 10, wherein the method includes determining an alternate route in compliance with the one or more obstacle clearance standards if the electric motor system is unable to produce the second degraded operation ceiling for at least the required time.

12. The non-transitory computer readable medium of claim 11, wherein the method includes displaying the alternate route on a cockpit display for pilot notification and/or approval.

13. The non-transitory computer readable medium of claim 9, wherein the method includes displaying warning that the one or more obstacle clearance standards are not complied with for the route if the electric motor system is unable to produce the second degraded operation ceiling for at least the required time.

14. The non-transitory computer readable medium of claim 9, wherein the multiengine aircraft is a twin engine aircraft having a heat engine powerplant and a hybrid electric powerplant (HEP) having a heat engine system and the electric motor system.

15. The non-transitory computer readable medium of claim 14, wherein the method includes determining the first OEI ceiling based only on power available from the heat engine system of the HEP.

16. The non-transitory computer readable medium of claim 15, wherein the method includes determining the second OEI ceiling based on power available from both the heat engine system and the electric motor system of the HEP.

17. A method, comprising:
determining whether an aircraft has degraded performance obstacle clearance for a route based on a current status of an electric motor system and/or a predicted status of the electric motor system at or near a location of an obstacle, wherein degraded performance obstacle clearance includes obstacle clearance based on a one engine inoperative (OEI) performance determined based only on power available from a first power source.

18. The method of claim 17, wherein the status is a battery state-of-charge (SOC) of the electric motor system.

19. The method of claim 17, wherein determining whether the aircraft has degraded performance obstacle clearance is done by determining if the aircraft can maintain clearance of all obstacles along the route to a predefined obstacle clearance standard.

20. The method of claim 18, further comprising determining an alternate route that provides degraded performance obstacle clearance to the predefined obstacle clearance standard.

* * * * *